United States Patent [19]

Jamzadeh

[11] Patent Number: 5,175,564
[45] Date of Patent: Dec. 29, 1992

[54] COLOR PRINTER WITH IMPROVED IMAGE REGISTRATION

[75] Inventor: Fereidoon S. Jamzadeh, Fairport, N.Y.

[73] Assignee: Eastman Kodak Company, Rochester, N.Y.

[21] Appl. No.: 733,898

[22] Filed: Jul. 22, 1991

[51] Int. Cl.⁵ .................................. G01D 15/14
[52] U.S. Cl. ......................... 346/108; 346/157; 355/327
[58] Field of Search ............... 355/326, 327, 317, 208, 355/272, 233; 346/108, 160, 157, 107 R, 76 L; 358/296, 300, 302, 75

[56] References Cited

U.S. PATENT DOCUMENTS

| | | | |
|---|---|---|---|
| 4,819,025 | 4/1989 | Takahashi et al. | 355/233 X |
| 4,831,412 | 5/1989 | Ohnishi et al. | 355/233 |
| 4,884,106 | 11/1989 | Harris | 355/327 X |
| 4,893,135 | 1/1990 | Jamzadel | 346/108 |
| 4,975,741 | 12/1990 | Tanaka | 355/208 X |
| 5,040,026 | 8/1991 | Jamzadeh et al. | 355/326 X |
| 5,049,897 | 9/1991 | Ng | 346/108 X |

Primary Examiner—Joan H. Pendegrass
Assistant Examiner—Robert Beatty
Attorney, Agent, or Firm—Warren W. Kurz

[57] ABSTRACT

A color printer includes a recording element which is advanced along a path to receive color-separation images of a desired multicolor image to be printed. Color-separation image recording is effected by a laser scanner which operates asynchronously with respect to the movement of the recording element and functions to periodically scan an intensity-modulated beam of radiation across the moving recording element to record a multitude of equally spaced image lines that collectively define a two-dimensional latent image. In response to a print enable signal, the laser scanner begins scanning the first line of a color-separation image at any time within a line-time interval required to scan each image line. According to a preferred embodiment of the invention, the print enable signal is provided a predetermined fraction of the line-time interval earlier for the second and subsequent color-separation images of a desired multicolor image than it is for the first color-separation image. In this manner the color-separated images are better registered with respect to a nominal position on the recording element.

13 Claims, 9 Drawing Sheets

FIG.8

COLOR PRINTER WITH IMPROVED IMAGE REGISTRATION

BACKGROUND OF THE INVENTION

The present invention relates to improvements in color printers of the type which employ an asynchronous laser scanner or the like to sequentially record a series of color-separated images on a recording element moving along a path. More particularly, it relates to apparatus for reducing registration errors between successively formed color-separated images.

In the commonly assigned U.S. Patent Application Ser. No. 688,004, filed on Apr. 19, 1991 in the name of Kevin M. Johnson and entitled POSITION CONTROL APPARATUS FOR TRANSFER DRUM IN ELECTROSTATOGRAPHIC PRINTER/COPIER, there is disclosed a color electrophotographic printer for producing multicolor prints on image receiver sheets. Such a printer comprises a drum-shaped recording element which is rotatably driven about its axis to present its photoconductive outer surface to the various processing stations required to produce transferable color-separated images thereon. During each revolution of the photoconductive drum, one complete color-separated image is formed. This image is immediately transferred from the outer surface of the image process drum to a receiver sheet carried on the outer surface of a rotating transfer drum as the respective drum surfaces pass through a transfer zone defined by a nip between the drums. The process drum is then recycled through the processing stations to receive additional color-separated images which, when transferred to the receiver sheet in registration with previously transferred color-separated images, provide a full color print of a desired image. Obviously, the ultimate print quality depends, in large part, on the sharpness in the registration among the transferred images, and such registration depends, in part, on the ability to produce transferable images at a precise location on the photoconductive surface of the recording element.

In the color printer described above, a raster image scanner, in this case a conventional laser scanner, is used to imagewise expose the photoconductive drum in order to produce a developable, latent (i.e. electrostatic) image thereon. In producing this image, the laser scanner repeatedly scans the moving surface of the photoconductive drum with an intensity-modulated beam of actinic radiation, whereby the image is produced on a line-by-line basis. Scanning of the beam is effected by a rotating polygon (or hologon) having a plurality of reflective facets which interact with the laser beam, one at a time, to sweep the beam across the photoconductive surface. The polygon rotates asynchronously with respect to the rotation of the photoconductive drum, meaning that the position in which the laser scanner records an image is not precisely linked with the drum position.

In the above apparatus, relatively accurate placement of the image on the surface of the photoconductive drum is achieved by detecting a mark on the drum perimeter. The output of the mark detector provides a control signal to a logic and control unit (LCU) to indicate that the beginning of the image frame on the photoconductive drum is approaching the exposure station. After an appropriate delay, the LCU directs the laser scanner to start the image exposure. If a polygon facet happens to be located such that it is directing the laser beam at the start of a scan line at the exact instant that the LCU commands that imaging begin, there will be no error in the position of the image vis-a-vis a nominal position on the drum surface. However, since the scanner operates asynchronously with respect to the movement of the drum, this is rarely the case. Most often, none of the reflective facets of the rotating polygon will be in a position to start a scan line at the precise instant that the LCU directs that printing should begin. Whenever the polygon must be further rotated to properly position one of its facets to start a new scan line following the LCU's print command, there will be a slight delay in the start of the image formation. This delay translates into a slight displacement error (e.g., by as much as 50 microns, in the case where the number of scan lines per centimeter is 200) of the position of the latent image relative to a nominal position along the perimeter of the drum. Thus, it may be appreciated that each color separated image on the drum may be misregistered with respect to previously formed images by as much as the width of one image line, depending on the rotational position of the polygon when the print command signal is produced. It will be noted that this misregistration is always biased in one direction. That is, the error is between zero and one line; there is no negative error.

The above-noted misregistration of the color-separated images on the photoconductive recording element may be compensated for by controlling the rate of advancement of the receiver sheets to the image transfer zone, slowing down the sheets when the image is formed too late vis-a-vis a nominal time, and speeding up the sheets when the image is formed too early. Such a compensation scheme is disclosed in the commonly assigned U.S. Pat. No. 4,893,135 issued in the name of Fereidoon S. Jamzadeh which discloses an asynchronously operated laser printer which electrophotographically records color-separated images on an endless photoconductive web. However, rather than providing a means for compensating for image misregistration after it has occurred, it is always desirable to minimize the error for which compensation is required. The present invention addresses the task of minimizing the above-noted image registration error on the recording element.

SUMMARY OF THE INVENTION

In view of the foregoing discussion, an object of this invention is to reduce by as much as 50% the image registration error inherent in the use of an asynchronously operating raster image scanner in a color printing apparatus.

The inventive concept is to eliminate the above-noted "bias" in the direction of the misregistration of related images on the recording element by allowing the error to occur between minus one-half line and plus one-half line with respect to the first-recorded image. Rather than using a mark on the recording element to trigger, for each of a plurality of related color separation images, a print command signal after a fixed time delay, the printer of the invention determines the time at which the first color separation was actually recorded, and uses this information to produce a print command signal at a fraction (e.g. $\frac{1}{2}$) of a line-time interval earlier for all succeeding color separation images. This has the effect of assuring that all subsequently recorded images are registered to within plus or minus the width of one-half scan line with respect to the first recorded image. rather than being registered to within one entire scan line. as is characteristic of the prior art. Thus, it will be appreciated that the above described registration error can be reduced by 50% by this concept. While the second, third and, if appropriate, fourth separation images may be misregistered with respect to each other by up to the width of one scan line, the total registration error (among all images) can be maintained to less than one scan line by using an averaging method in which, for example, the print enable signal for the third image is produced after a time interval which is a fraction of a scan line time interval shorter than the mean time interval between the times at which the mark detector produced a signal to initiate recording of the first two color separation images and the mean time at which the recording of these first two color separation images was actually initiated.

According to a preferred embodiment, the printer of the invention is characterized by image registration means comprising: (i) means for producing a control signal each time the recording element has advanced a predetermined distance along its path; (ii) timing and control means responsive to each control signal for providing the asynchronous line scanner with a print enable signal which enables the scanner to start recording an image at any time within a line-time interval defined by the time required to scan a single image line; and (iii) means operatively coupled to the timing and control means, for determining a first time interval representing the time period between the production of a first control signal and the time at which the line scanner actually begins to record a first image. The timing and control means further functions to provide the line scanner with a second print enable signal in response to the production of a second control signal produced after a second incremental advancement of said recording element along the path, such second print enable signal being produced a second time interval after the production of such second control signal, such second time interval being shorter, preferably by one-half a line-time interval, than the first time interval determined by said determining means.

The invention will be better understood from the ensuing description of preferred embodiments, reference being made to the accompanying drawings.

DETAILED DESCRIPTION OF PREFERRED EMBODIMENTS

In the ensuing description, the invention is discussed with particular reference to an electrographic color printer. Skilled artisans will appreciate, however, that the invention is not limited to use in such an apparatus and could, in fact, be used in any type of printer (including thermal, photographic and ink jet printers) in which images are formed on a moving recording element using any raster scanning device (including laser and flying spot scanners) which operates asynchronously with respect to the movement of the recording element. Also, though described with particular reference to a color printer in which a plurality of color-separated images are to be registered to form a multicolor print, the invention has utility in any other type of printing apparatus in which multiple related images are to be formed in registration to provide a composite print.

Figure 1:
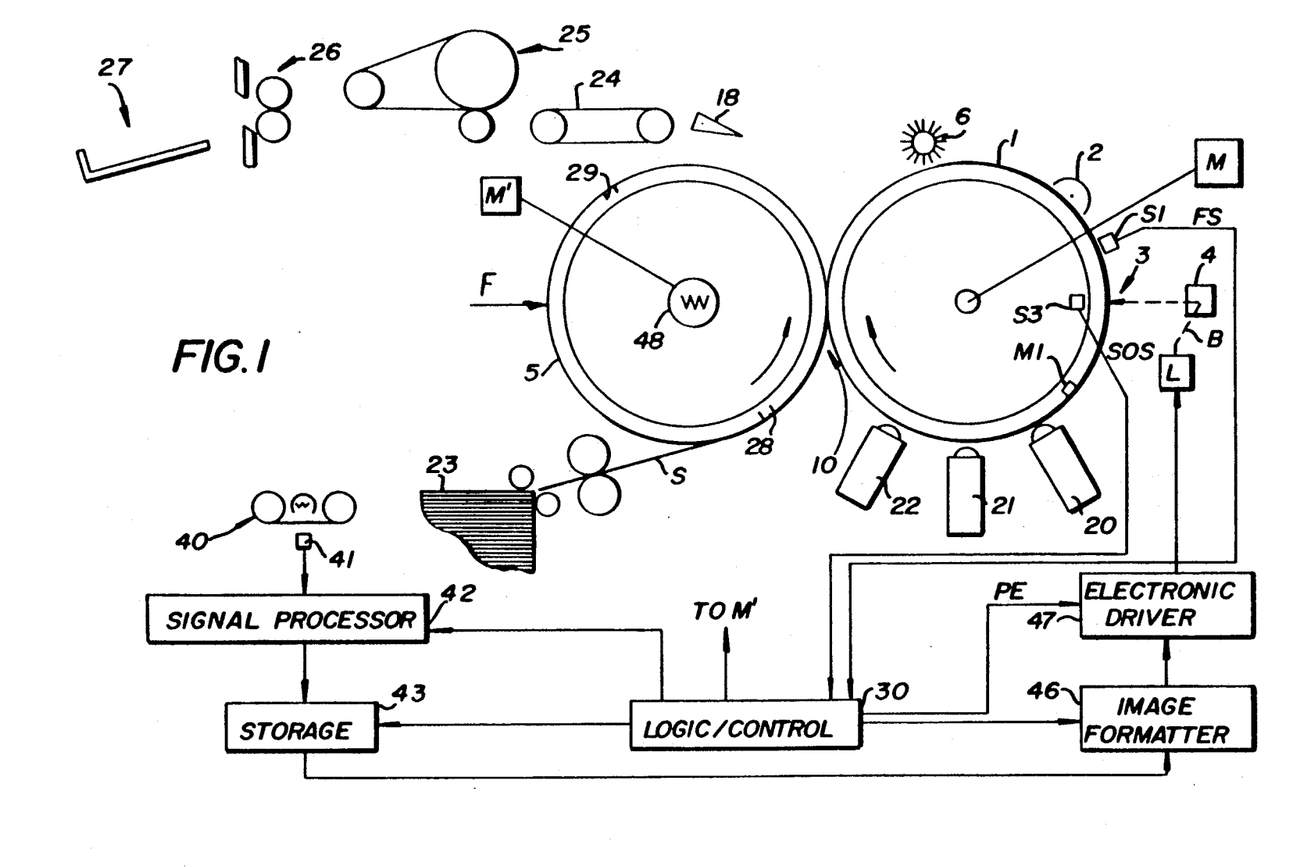
FIG. 1 is a schematic illustration of an electrophotographic color printer embodying the invention.

Referring to the drawings, FIG. 1 is a schematic illustration of an electrophotographic color printer embodying the invention. Most of the apparatus shown is conventional, as is its operation. The image recording element, for example, comprises a photoconductive drum 1 which is rotated at a constant angular velocity in a clockwise direction by a motor M. Positioned about the drum periphery are the various processing stations which act collectively to carry out the well-known electrophotographic image-forming process. A corona charging station 2 functions to uniformly charge the photoconductive surface of the process drum. This uniformly charged surface is then imagewise exposed at an exposure station 3 (described in more detail below) to form a developable electrostatic charge image. In a full color printing system, a series of charge images are formed in this manner, each representing a different color-separation of a full color image to be printed. In the printing system illustrated, one charge image is formed during each drum revolution, and each such charge image is rendered visible as it passes one of a plurality of development stations 20, 21 and 22. The latter serve to apply a suitably colored toner to the charge images. The toner images so produced are then transferred, seriatim and in registration, to a receiver sheet S carried on the surface of a rotatably driven transfer drum 5. Such transfer is effected at an image transfer station 10 defined by the nip region between the process and transfer drums. After image transfer, the process drum is cleaned of residual toner by a cleaning station 6 and recycled through the image-forming process.

The image receiver sheets are fed from a sheet supply 23 toward the outer surface of the transfer drum. As each sheet approaches the transfer drum, it is secured to the transfer drum by gripping fingers or, as illustrated, by a series of vacuum ports 28 and 29 which secure the leading and trailing edges of the sheet to the drum surface. Rotation of the transfer drum operates to advance the receiver sheet through the image-transfer station where the receiver sheet receives the developed toner images from the process drum. The transfer drum may be heated by an internal heating element 48 and pressed into engagement with the process drum by a force F to facilitate image transfer. Assuming the process drum bears, during three successive revolutions, three toner images of different color (e.g., cyan, yellow and magenta), the transfer drum makes three revolutions through the transfer station so that the receiver sheet receives the three images, one atop the other. Following transfer of the three images, the receiver sheet is stripped from the transfer drum by a stripping mechanism 18. The receiver sheet is then pushed by further rotation of the transfer drum onto a sheet transport 24 which transports it to a toner fixing device 25 and then to a cutter 26. After the sheet has been cut to desired sizes, the resulting prints are deposited in a tray 27.

Transfer drum 5 is rotatably driven by a stepper motor M' in order to present the leading edge of an attached receiver sheet to the image-transfer nip between the two drums. The drums are very closely spaced apart (nominally, by the compacted thickness of the receiver sheet) so that, after the receiver sheet enters the transfer nip, the transfer drum is advanced by the frictional contact between the process drum and the receiver sheet. Operation of the stepper motor M' is controlled by a logic and control unit (LCU) 30 which assures that, as the toner images formed on drum 1 approach the transfer nip, a desired portion of a receiver sheet carried by the transfer drum is positioned to receive it. Such motor control is disclosed in the commonly assigned U.S. Pat. No. 5,040,026, filed in the names of F. S. Jamzadeh and T. J. Yound entitled "Method and Apparatus for Transferring Color Images in Registration."

Exposure station 3 comprises any conventional raster image scanner which operates asynchronously with respect to the movement of the process drum 1 to scan an image, line-by-line, on the photosensitive surface of the process drum 1. Such scanner may comprise, for example, a diode laser L which operates, under the control of an information source to produce an intensity-modulated beam B. A rotating polygon or hologon 4 serves to repeatedly sweep the beam across the width of the process drum, parallel to the drum's axis of rotation. As beam B scans the drum surface, it selectively dissipates the uniform charge thereon and thereby forms a developable charge image. The input for the exposure station 3 may be provided by a color scanner 40 which typically includes a color-responsive charge coupled device (CCD) 41 for scanning an original to be printed, for example, a 35 mm color negative film. The CCD output is fed to a signal processor 42 which converts it to a form suitable for storage in a memory 43. The signal processor can also be used to enhance the image, as is well known. LCU 30 serves to access the images stored in memory 43 and manage the timing of the entire apparatus. The LCU may also be responsive to a print format designation signal supplied by an operator control panel (not shown) which would supply that information in an appropriate form to an image formatter 46 which, in turn, would provide the bit map for the ultimate exposure. The output of the image formatter controls an electronic driver 47 which, in turn, intensity-modulates the output of the laser source in accordance with image information to be recorded.

As indicated above, the placement of each charge image along the periphery of the photoconductive drum is controlled by the LCU 30. To provide this control, the LCU receives a "frame start" signal FS indicating that the particular portion or "frame" of the process drum which is to receive an image is approaching the exposure station. This FS control signal is provided by a sensor S1 which is located at a fixed position along the path of drum 1 and functions to sense a mark M1 on the drum perimeter. After a nominal time interval has elapsed following receipt of such control signal, the LCU produces a "print-enable" signal PE which enables the laser scanner to start the image forming process. Since the rotating polygon of the laser scanner is rotating asynchronously with respect to the movement of the drum, a reflective facet of the polygon is usually not in a position to start a scan line at the precise instant that the LCU enables printing to begin. Whenever the polygon must be further rotated to properly position one of its facets to start a new scan line following the LCU's print enable signal, there will be a slight delay in the start of the image formation. The maximum time of this delay will be the "scan-line-time" (SLT), i.e., the time required to scan one entire image line across the drum surface. In prior art printers, the formation of each color-separated image is triggered by the mark on the recording element, i.e. mark M1. For the reasons stated above, this results in a registration error between the first and any subsequently formed image of one scan line.

Now, in accordance with the present invention, the registration error noted above is substantially reduced. Rather than using mark M1 to trigger all print enable signals after a fixed time period following the production of the FS signal, the printing apparatus of the invention operats to produce the second and subsequent print enable signals based on the actual time at which the first-formed color separated image was recorded. Upon determining the time at which the first image was recorded, the printer of the invention uses this information to produce subsequent print enable signals at a fraction (e.g. $\frac{1}{2}$) of a scan-line-time interval earlier for all succeeding images which are to be registered with the first image. This has the effect of assuring that at least the second color separation image, and, if desired, additional color separation images as well, is registered to within plus or minus the width of one-half scan line with respect to the first recorded image, rather than being registered to within one entire scan line, as is characteristic of the prior art. Thus, it will be appreciated that the above described registration error can be reduced by 50% by this concept.

Figure 2:
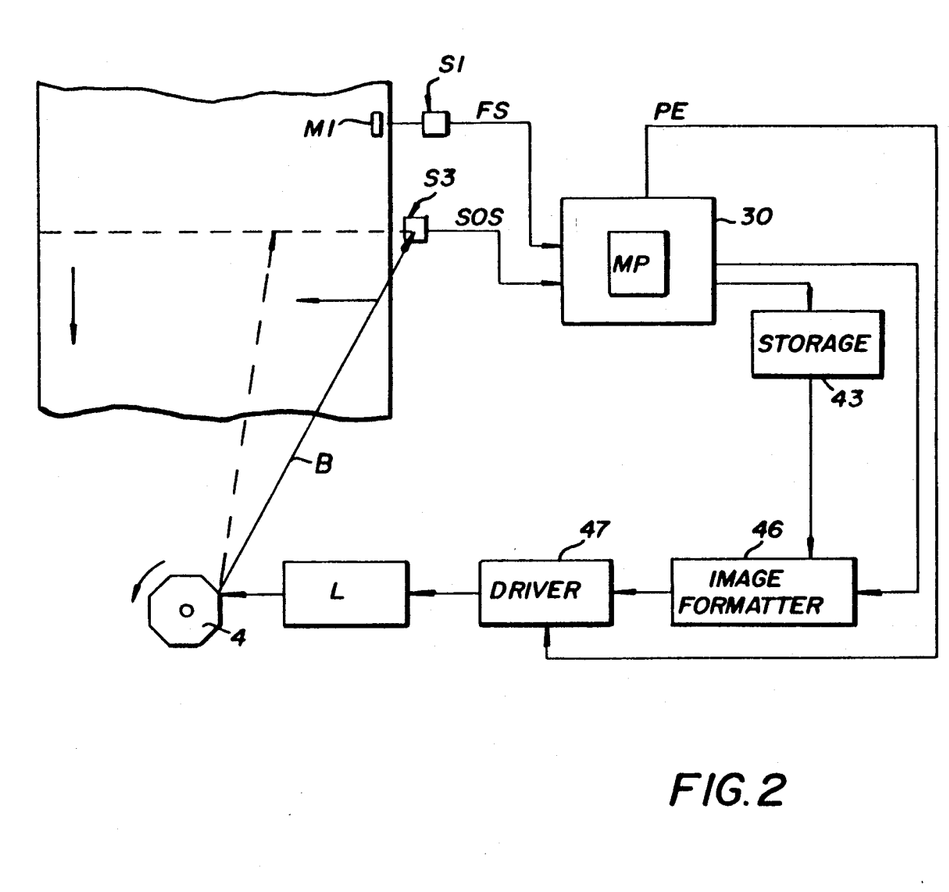
FIG. 2 is a block diagram illustrating preferred apparatus for implementing the invention.

Referring to FIG. 2, the printing apparatus of the invention includes a microprocessor MP which is programmed (as described below) to provide print enable signals (PE's) at the precise time required to achieve the above-stated objective of the invention. The printer also comprises a transducer, e.g., a photosensor S3 which is positioned to be irradiated by the scanning laser beam immediately before the beam records the first pixel in a line of image information. Upon being irradiated, photosensor S3 produces a "start-of-scan" (SOS) signal which is input to the microprocessor. The manner in which the microprocessor operates on the FS and SOS signals to control the timing of the PE signals can be best understood with reference to FIG. 3.

Assuming the desirability of registering three color-separated images on the same portion of the process drum, the LCU receives a first frame-start signal FS1 as the mark M1 passes sensor S1. After a fixed time delay $t_0$ which is sufficient to allow the leading edge of the image frame to reach the exposure station, a first print enable signal PE1 is produced. At this time, an internal clock is started within the LCU. Due to the asynchronous operation of the laser scanner, the first image line can be scanned at any time within the scan-line-time SLT period. As soon as scanning is initiated, sensor S3 is irradiated and a first start-of-scan signal SOS1 is produced. Upon receiving the SOS1 signal, the LCU stops the internal clock and records the time interval $t_1$, between PE1 and SOS1. As is apparent in FIG. 3, the sum of this time intervals $t_0$ and $t_1$ determines the exact time of recording of the first color-separated image following the production of FS1. Assuming it is desired to register the second and third color-separated images to within plus or minus one-half scan line relative to the first image, the LCU produces the second and third print enable signals, PE2 and PE3, at a time $t'_0$ equal to $t_0 + t_1 - SLT/2$ following the production of the second and third frame-start signals, FS2 and FS3, where $t_0$ is the fixed time interval between FS1 and PE1, and $t_1$ is the measured time interval between PE1 and SOS1. While the second and third images may be misregistered with respect to each other by as much as one scan line, that is, $t_2-t_3$ can equal SLT, these images will each be registered to within one-half scan line of the first image. To minimize the visual effect of having the second and third images misregistered by up to the width of one scan line, it is preferred that the first color separation be either magenta or cyan since a misregistration between these two colors is easier to perceive than a misregistration between either of these colors and yellow.

Figure 3:
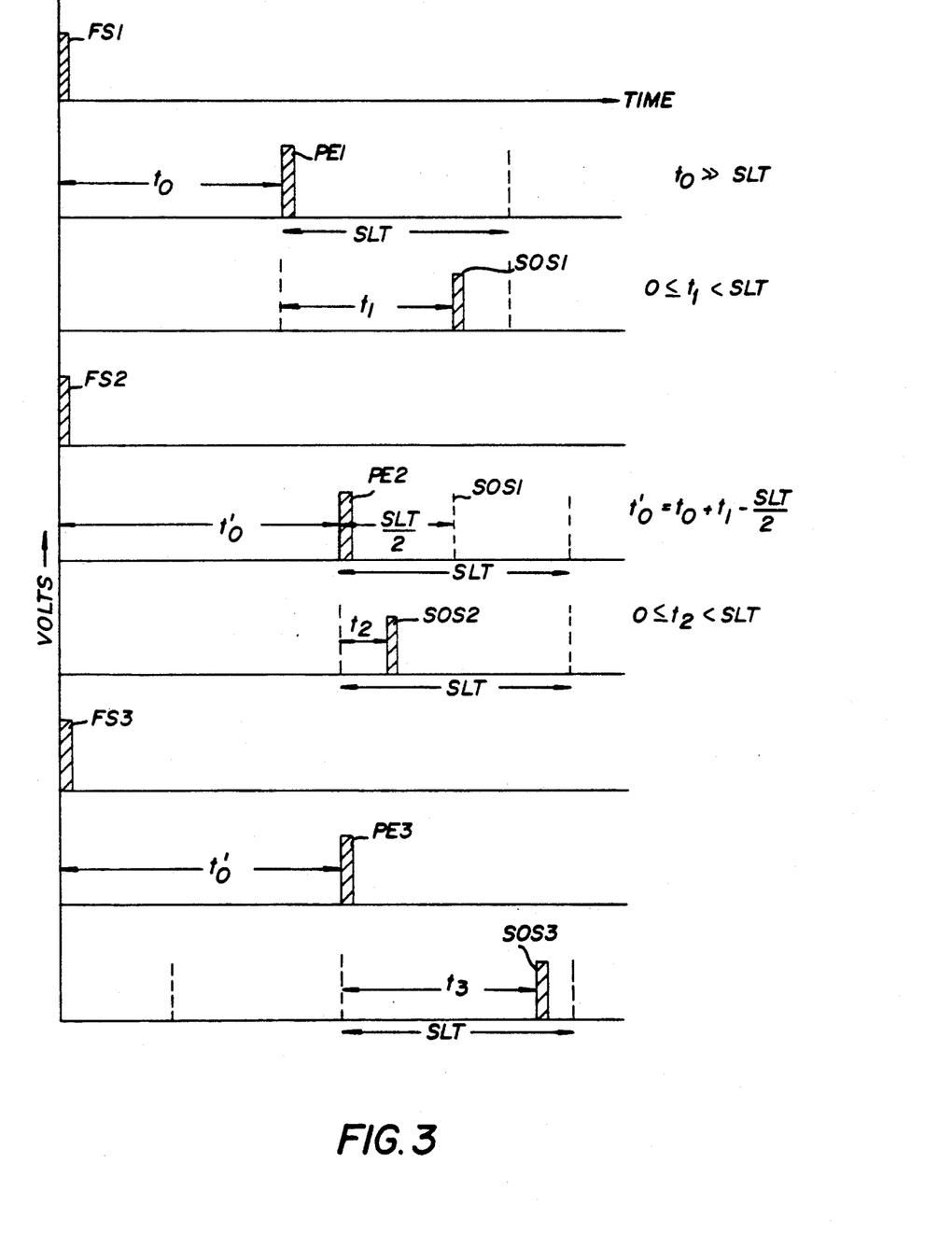
FIGS. 3 and 4 are timing diagrams illustrating the timing of preferred embodiments of the invention.
Figure 4:
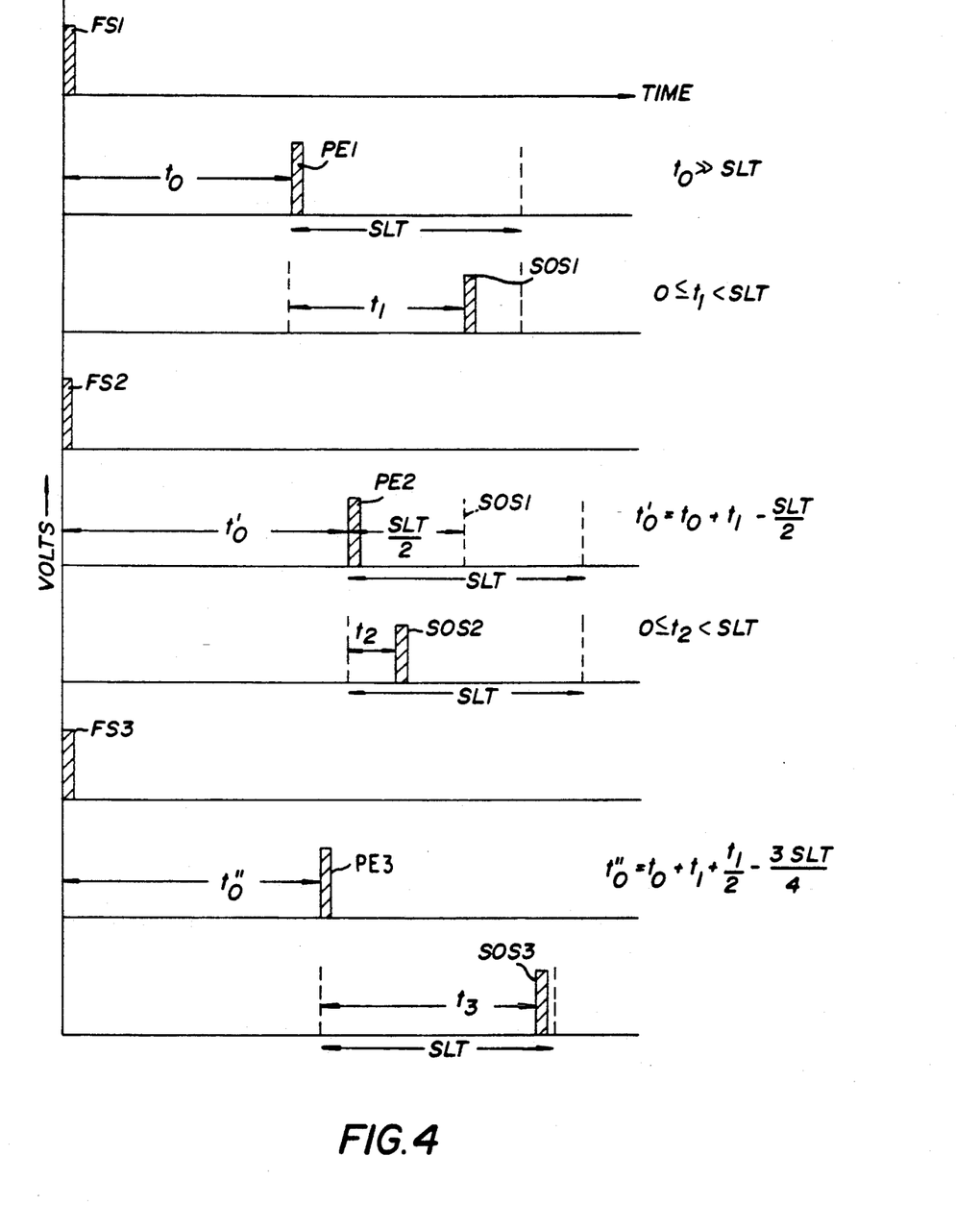

The timing chart shown in FIG. 4 is similar to FIG. 3 except, in this case, the third color separation is positioned to within one-half scan line of the mean position of the first two images. To do this, the third print enable signal PE3 should be produced at a time $t''_0$ which is $SLT/2$ before the mean time at which the SOS1 and SOS2 signals are produced. From the drawings, it will be seen that SOS1 is produced at a time equal to $t_0+t_1$, measured from the first frame start signal (FS1), and SOS2 is produced at a time equal to $t'_0+t_2$, measured from the second frame start signal (FS2). The mean time of these two SOS signals is $[(t_0+t_1)+(t'_0+t_2)]/2$. Since $t'_0=t_0+t_1-SLT/2$, the mean time of SOS1 and SOS2 can be shown, by substitution, to equal $t_0+t_1+t_2/2-SLT/4$. Since PE3 should be produced at one half of a scan line time before the mean time of the start-of-scan signals, SOS1 and SOS2, it is apparent that the third print enable signal PE3 is produced at a time $t''_0=t_0+t_1+t_2/2-3SLT/4$, where $t_2$ is the time interval between PE2 and SOS2.

Figure 5:
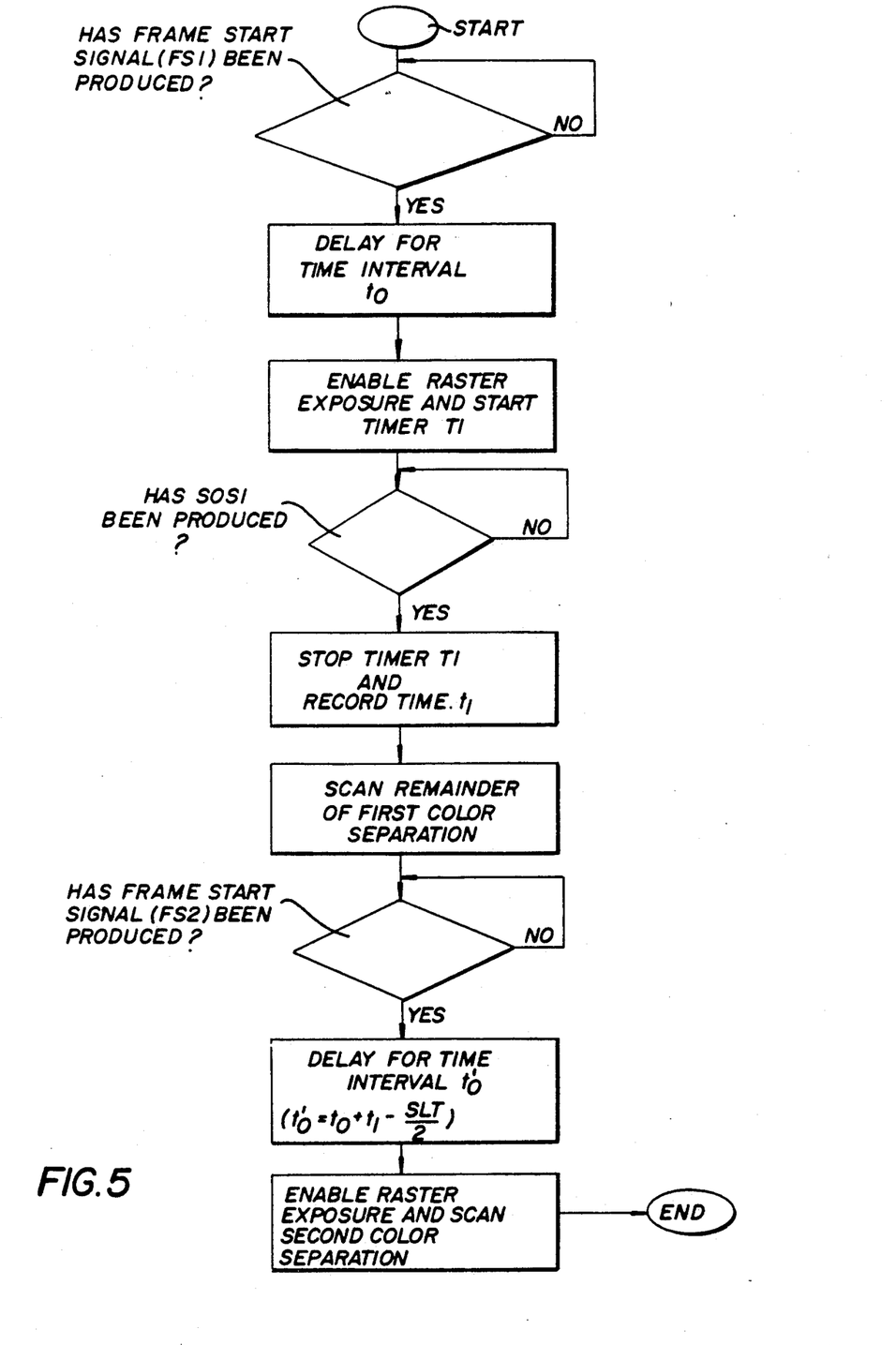
FIGS. 5-8 are flow charts illustrating methods of implementing various image registration schemes using microprocessor control.

The flow charts shown in FIGS. 5–8 illustrate the various steps performed by the microprocessor in producing the print enable signals at the appropriate times. In FIG. 5, the process is illustrated for achieving one-half line registration between successively formed images. First, the microprocessor looks for the FS1 signal indicating that the image frame on the process drum is approaching the exposure station. Upon receipt, the microprocessor delays a predetermined time period $t_0$ and produces a first print enable signal and starts an internal timer T1 running. The microprocessor then awaits receipt of the first start-of-scan signal SOS1 indicating that the first line of the first image is about to be scanned. Upon receipt of signal SOS1, the microprocessor stops clock T1 and internally records the time interval $t_1$. Thereafter, the first image is completely scanned, and the microprocessor awaits receipt of the next frame start signal, FS2. Upon receipt, the microprocessor delays for the time interval $t'_0=t_0+t_1-SLT/2$. After this period has elapsed, the microprocessor enables the raster to scan the second image.

Figures 6, 6A:
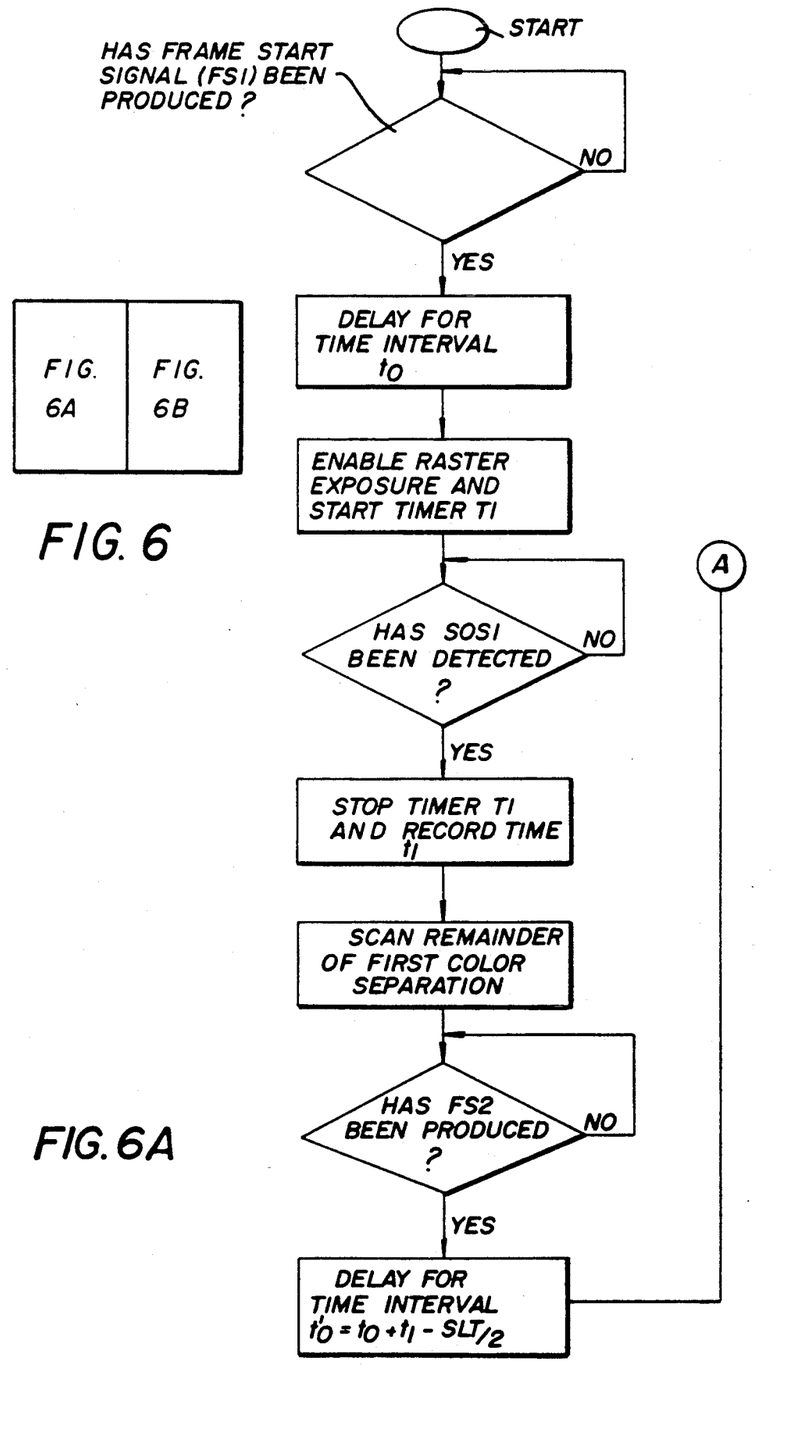
Figure 6B:
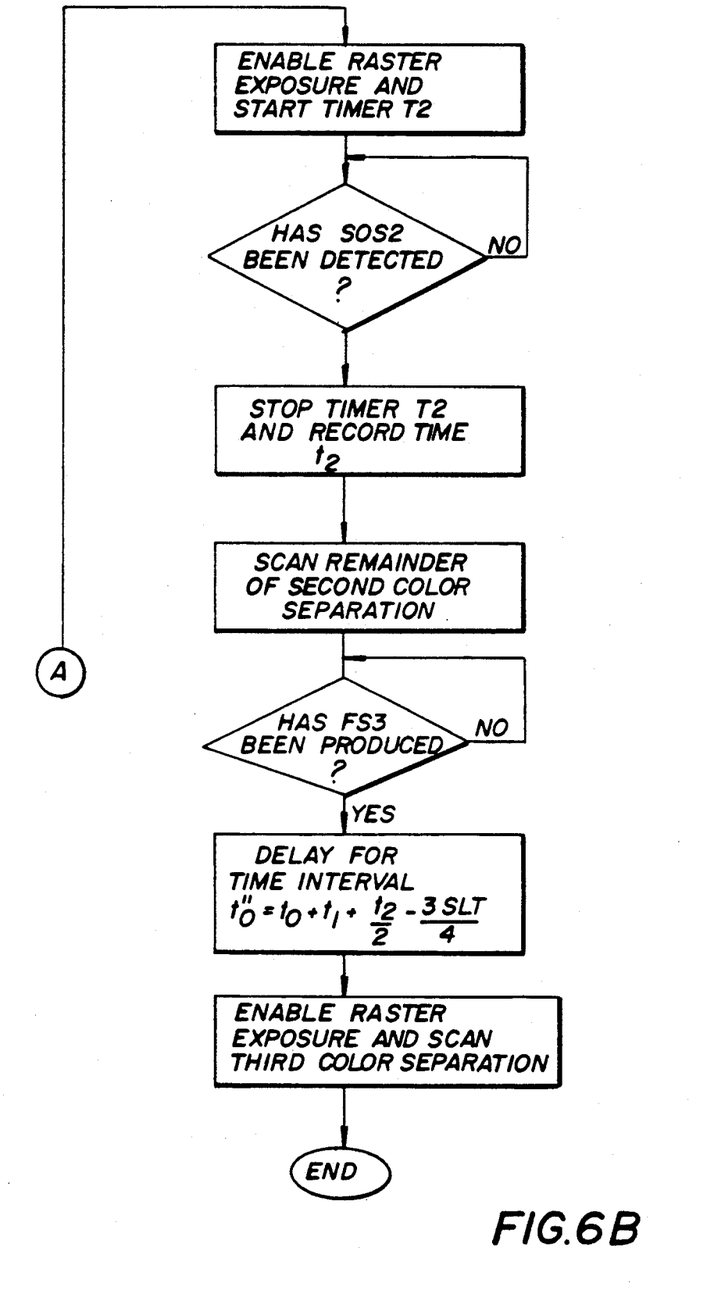
Figure 7:
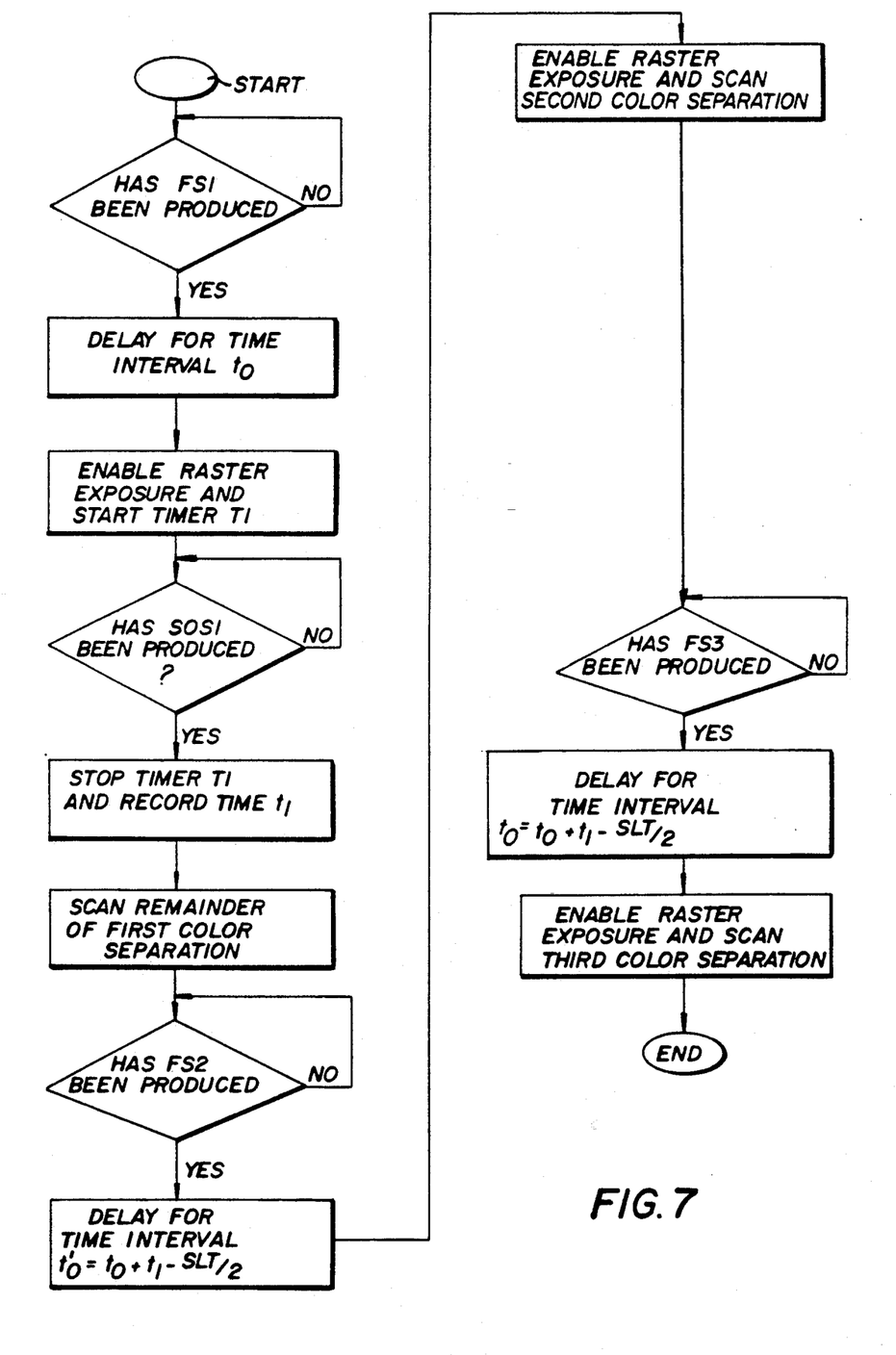
Figure 8:
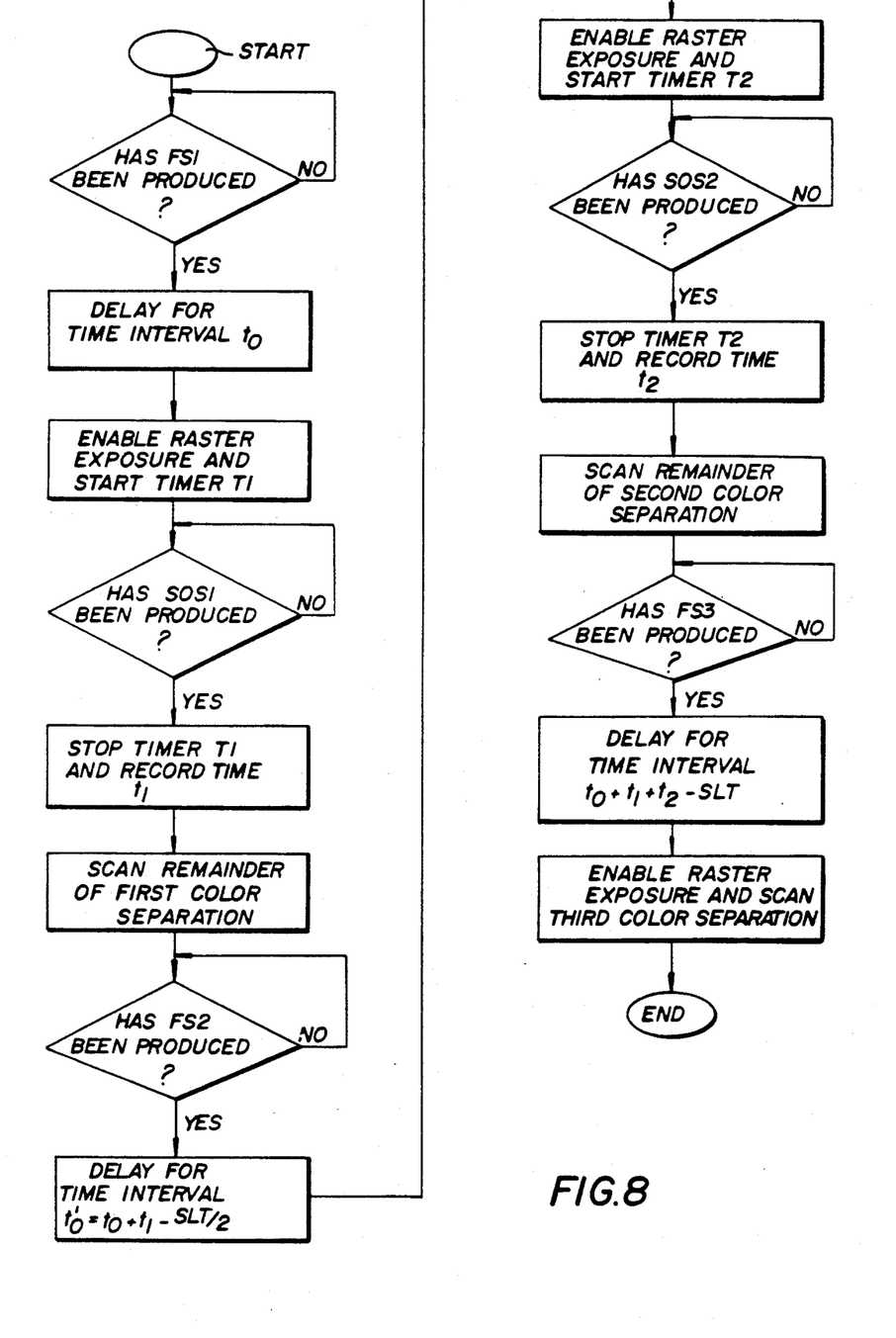

In the flow charts provided in FIGS. 6–8, various processes for registering three images are shown. In all FIGS., the process for registering the first two colors is the same as described above with reference to FIG. 5. In FIG. 6, a process is shown for registering the third color to within one-half line registration of the mean position of the first two images is shown. In FIGS. 7 and 8, steps are shown for registering the third color to within one-half line registration of the first-formed and the second-formed images, respectively. In FIG. 7, it is apparent that the raster is enabled to produce the second and third color separations following the same delay interval $(t_0+t_1-SLT/2)$ which is based on the time at which the first color separation was produced (i.e., $t_0+t_1$). In FIG. 8, it is apparent that the third color separation is based on the time at which the second start-of-scan signal SOS2 was produced, i.e., $t'_0+t_2-SLT/2$. By substitution, this time delay can be shown to equal $t_0+t_1+t_2-SLT$.

It will be appreciated that the inventive concept can be extended to four or more color-separated images. In a four-color system where the third and fourth images are based on the mean positions of the previously formed images, the worst case maximum misregistration among the four images is limited to $\frac{7}{8}$ line. In the case of three colors, the maximum registration error is $\frac{3}{4}$ line. For n colors, the maximum error is $[2^{(n-1)}-1]/2^{(n-1)}$. As already mentioned, proper selection of colors can minimize the perceived error.

In the discussion above, the different color-separated images formed on the process drum 1 are transferred in registration to a single image receiving sheet. It will be appreciated, however that the invention is also useful in a master-making process for xeroprinting in which a series of monochrome toner images, each representing the color content of a multicolor image at different wavelength regions, must be transferred, with great accuracy, to a precise portion of different receiver sheets. Each of such sheets is subsequently used as a master in the xeroprinting process.

The invention has been described in detail with particular reference to preferred embodiments thereof, but it will be understood that variations and modifications can be effected within the spirit and scope of the invention. As an example of a variation of the present invention, a shaft encoder operatively coupled to the shaft of the photoconductor drum for producing the signal FS may be employed instead of the mark MI and the sensor SI.

What is claimed is:

1. A printer comprising:
   (a) a photosensitive recording element;
   (b) drive means for causing said recording element to cycle about an endless path;
   (c) image-forming means positioned along said path for producing transferable images on a surface of said recording element as said recording element cycles along said path, said image-forming means comprising a beam scanner for periodically scanning said surface with an intensity-modulated beam of actinic radiation in a direction transverse to the direction of advancement of said recording element to record thereon successive lines of a latent image; and developing means for applying pigmented particles to said surface to render said latent image visible, said beam scanner operating asynchronously with the movement of said recording element and being responsive to a print enable signal to begin recording the first line of a latent image at any time within a line-time interval required to record a single image line;
   (d) means for transferring said pigmented particles from the recording element to a receiver sheet during each cycle of the recording element along said endless path; and
   (e) registration means for reducing any displacement of successively recorded latent images on the recording element, said registration means comprising: (i) means for producing a control signal each time the recording element has cycled a predetermined distance along said path; (ii) timing and control means responsive to each control signal for providing said beam scanner with a print enable signal during each cycle of the recording element along said endless path; (iii) means operatively coupled to said timing and control means, for determining the time interval between the production of a first control signal produced during a first cycle of the recording element along said path, and the time at which said beam scanner actually begins to record a first image; said timing and control means further functioning to provide said beam scanner with a second print enable signal in response to the production of a second control signal produced during a second cycle of said recording element along said endless path, said second print enable signal being produced a predetermined time interval after the production of said second control signal, said predetermined time interval being shorter, by less than said line time interval, than the time interval determined by said determining means.

2. The apparatus as defined by claim 1 wherein said determining means comprises a transducer positioned to be irradiated by the beam scanner at the start of a line scan and adapted to produce a signal upon being irradiated.

3. The apparatus as defined by claim 1 wherein said control signal-producing means comprises a sensor positioned along said path for sensing a mark on the recording element.

4. The apparatus as defined by claim 1 wherein said drive means comprises a rotatable member having a central shaft, and said control signal-producing means comprises a shaft encoder operatively coupled to said shaft.

5. The apparatus as defined by claim 1 wherein said predetermined time interval is about one-half of a line-time interval shorter than the time interval determined by said determining means.

6. A color printer comprising:
 (a) a radiation-sensitive recording element driven along an endless path;
 (b) image-forming means positioned along said path for producing color-separation images on a surface of the recording element as said recording element cycles along said path, said image-forming means comprising: (i) a laser scanner for periodically scanning said surface with an intensity-modulated laser beam of actinic radiation in a direction transverse to the direction of advancement of said recording element to record, during each cycle of the recording element along said path, successive lines of a latent, color-separated image; and (ii) developing means for rendering visible different latent, color-separated images, said laser scanner operating asynchronously with the movement of said recording element and being responsive to a print enable signal to begin recording the first line of a latent, color-separated image at any time within a line-time interval defined by the time required to record a single image line; and
 (c) registration means for reducing any displacement of successively formed latent, color-separated images on the recording element, said registration means comprising: (i) means for producing a control signal each time the recording element has cycled to a predetermined position along said path; (ii) timing and control means responsive to each control signal for providing said laser scanner with a print enable signal during each cycle of said recording element along said endless path; and (iii) means operatively coupled to said timing and control means for determining the time interval between the production of a first control signal produced during a first cycle of the recording element along said path and the time at which said laser scanner actually begins to record a first color-separated image, said timing and control means further functioning to provide said laser scanner with a second print enable signal in response to the production of a second control signal produced during a second cycle of said recording element along said endless path, said second print enable signal being produced a predetermined time interval after the production of said second control signal, said predetermined time interval being a fraction of said line time interval shorter than the time interval determined by said determining means.

7. The apparatus as defined by claim 6 wherein said fraction of said line-time interval is approximately ½.

8. A color electrophotographic printer comprising:
 (a) a photoconductive recording element driven along an endless path;
 (b) image-forming means positioned along said path for producing transferable images of different color on a surface of the photoconductive recording element as said recording element cycles along said path, said image-forming means comprising: (i) charging means for uniformly electrostatically charging said surface; (ii) a laser scanner for periodically scanning said surface with an intensity-modulated laser beam of actinic radiation to record, during successive cycles of the recording element along said endless path, successive lines of a plurality of different electrostatic images, each of such electrostatic images representing a different color-separation of a multicolor image to be produced on an image receiver sheet; and (iii) developing means for successively applying different color toner particles to said surface to render each of said electrostatic images visible, said laser scanner operating asynchronously with the movement of said recording element and being responsive to a print enable signal to begin recording the first line of each electrostatic image at any time within a line-time interval required to record each line of an electrostatic image;
 (c) means for sequentially transferring the pigmented particles representing each of the developed electrostatic images from the recording element to a receiver sheet to form a multicolor image on said receiver sheet; and
 (d) registration means for reducing any displacement of successively formed electrostatic images on the recording element, said registration means comprising: (i) means for producing a control signal each time the recording element has cycled to a predetermined position along said path; (ii) timing and control means responsive to each control signal for providing said laser scanner with a print enable signal during each cycle of said recording element along said endless path; and (iii) means operatively coupled to said timing and control means for determining the time interval between the production of a first control signal produced during a first cycle of the recording element along said path and the time at which said laser scanner actually begins to record a first color-separated image, said timing and control means further functioning to provide said laser scanner with a second print enable signal in response to the production of a second control signal produced during a second cycle of said recording element along said endless path, said second print enable signal being produced a predetermined time interval after the production of said second control signal, said predetermined time interval being a fraction of said line-time interval shorter than the time interval determined by said determining means.

9. The apparatus as defined by claim 8 wherein said fraction of said line-time interval is approximately ½.

10. The apparatus as defined by claim 8 wherein each of said transferable images of different color is transferred to a different receiver sheet to provide a series of monochrome masters useful in a multicolor xeroprinting process.

11. A color printer comprising:
 (a) a radiation-sensitive recording element driven along an endless path;
 (b) image-forming means positioned along said path for producing at least three, substantially registered, color-separation images on a surface of the recording element as said recording element cycles along said path, said image-forming means comprising: (i) a laser scanner for periodically scanning said surface with an intensity-modulated beam of actinic radiation in a direction transverse to the direction of advancement of said recording element to record, during each cycle of the recording element along said path, successive lines of a latent, color-separated image; and (ii) developing means for rendering visible different latent, color-separated images, said laser scanner operating asynchronously with the movement of said recording element and being responsive to a print enable signal to begin recording the first line of a latent, color-separated image at any time within a line-time interval defined by the time required to record a single image line; and
 (c) registration means for reducing any displacement of successively formed latent, color-separated images on the recording element, said registration means comprising: (i) means for producing a control signal each time the recording element has cycled to a predetermined position along said path; (ii) timing and control means responsive to each control signal for providing said laser scanner with a print enable signal; and (iii) means operatively coupled to said timing and control means for determining the mean time interval between the production of a control signal and the mean time at which said laser scanner actually began to record first and second color-separated images during first and second cycles of the recording element along said path, said timing and control means further functioning to provide said laser scanner with a third print enable signal in response to the production of a third control signal produced during a third cycle of said recording element along said endless path, said third print enable signal being produced a predetermined time interval after the production of said third control signal, said predetermined time interval being a fraction of said line-time interval shorter than the mean time interval determined by said determining means.

12. The apparatus as defined by claim 11 wherein said fraction of said line-time interval is approximately ½.

13. A printer comprising:
 (a) a recording element;
 (b) drive means for advancing said recording element along a path;
 (c) image-forming means positioned along said path for producing images on a surface of said recording element as said recording element advances along said path, said image-forming means comprising a beam scanner for periodically scanning said surface with an intensity-modulated beam of actinic radiation in a direction transverse to the direction of advancement of said recording element to record thereon successive lines of an image, said beam scanner operating asynchronously with respect to the advancement of said recording element and being responsive to a print enable signal to begin recording the first line of an image at any time within a line-time interval required to record a single image line; and
 (d) registration means for reducing any displacement of successively recorded latent images on the recording element with respect to a nominal position on the surface of said recording element, said registration means comprising: (i) means for producing a control signal each time the recording element has advanced a predetermined distance along said path; (ii) timing and control means responsive to each control signal for providing said beam scanner with a print enable signal; and (iii) means operatively coupled to said timing and control means, for determining the time interval between the production of a first control signal and the time at which said beam scanner actually begins to record a first image, said timing and control means further functioning to provide said beam scanner with a second print enable signal in response to the production of a second control signal produced during a second incremental advancement of said recording element along said path, said second print enable signal being produced a predetermined time interval after the production of said second control signal, said predetermined time interval being shorter, by less than said line-time interval, than the time interval determined by said determining means.

* * * * *